(12) United States Patent
Konada et al.

(10) Patent No.: US 11,975,583 B2
(45) Date of Patent: May 7, 2024

(54) VEHICLE

(71) Applicant: HONDA MOTOR CO., LTD., Tokyo (JP)

(72) Inventors: Kazuya Konada, Wako (JP); Satoshi Ohno, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 17/674,988

(22) Filed: Feb. 18, 2022

(65) Prior Publication Data

US 2022/0305864 A1    Sep. 29, 2022

(30) Foreign Application Priority Data

Mar. 25, 2021   (JP) .................................. 2021-051519

(51) Int. Cl.
| | | |
|---|---|---|
| *B60G 17/00* | (2006.01) | |
| *B60G 17/015* | (2006.01) | |
| *B60G 17/019* | (2006.01) | |
| *B60R 21/0132* | (2006.01) | |
| *B60R 21/01* | (2006.01) | |

(52) U.S. Cl.
CPC ... *B60G 17/0157* (2013.01); *B60G 17/01908* (2013.01); *B60R 21/0132* (2013.01); *B60G 2202/422* (2013.01); *B60G 2400/102* (2013.01); *B60G 2400/942* (2013.01); *B60G 2600/73* (2013.01); *B60R 2021/01013* (2013.01); *B60R 2021/01325* (2013.01)

(58) Field of Classification Search
CPC .......................... B60G 17/015; B60G 17/0157
See application file for complete search history.

(56) References Cited

U.S. PATENT DOCUMENTS

| | | | |
|---|---|---|---|
| 2014/0265170 A1* | 9/2014 | Giovanardi | ........... F16K 11/065 |
| | | | 280/5.5 |
| 2015/0224845 A1* | 8/2015 | Anderson | ................. F03G 7/08 |
| | | | 701/37 |
| 2021/0129650 A1* | 5/2021 | Gaither | .................... B60K 1/00 |

FOREIGN PATENT DOCUMENTS

| | | |
|---|---|---|
| JP | 2012-131395 | 7/2012 |
| JP | 2013-241064 A | 12/2013 |
| JP | 2016-55667 A | 4/2016 |
| JP | 2021-35799 A | 3/2021 |

OTHER PUBLICATIONS

Japanese Office Action dated Nov. 29, 2022 issued in corresponding Japanese application No. 2021-051519; English machine translation included (9 pages).

* cited by examiner

*Primary Examiner* — Long T Tran
(74) *Attorney, Agent, or Firm* — Rankin, Hill & Clark LLP

(57) ABSTRACT

A vehicle includes an acceleration sensor detecting collision, an electric actuator disposed outside a vehicle body, a battery and a boosting circuit supplying a high voltage to the electric actuator, and an electric suspension control ECU controlling the boosting circuit and the electric actuator, and in a case where the acceleration sensor detects the collision, the electric suspension control ECU limits the supply of the high voltage to the electric actuator.

5 Claims, 4 Drawing Sheets

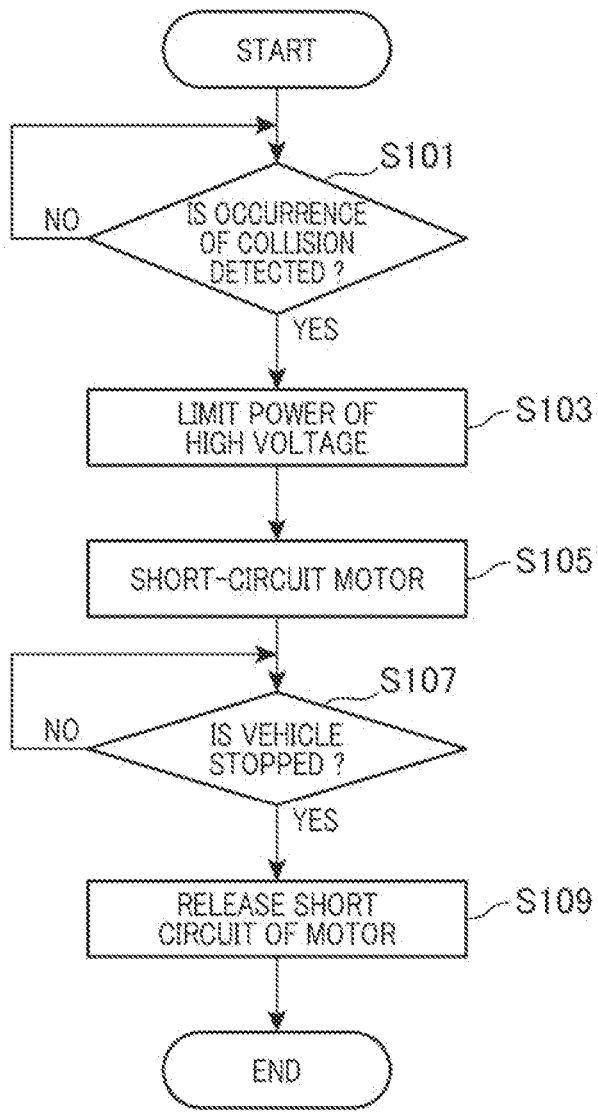

VEHICLE

INCORPORATION BY REFERENCE

The present application claims priority under 35 U.S.C. § 119 to Japanese Patent Application No. 2021-051519 filed on Mar. 25, 2021. The content of the application is incorporated herein by reference in its entirety.

BACKGROUND OF THE INVENTION

Field of the Invention

The present invention relates to a vehicle.

Description of the Related Art

Heretofore, a technology concerning an electric suspension apparatus mounted in a vehicle and driven with a motor has been known.

For example, in an electric suspension apparatus described in Japanese Patent Laid-Open No. 2012-131395, an output voltage (motor drive voltage) of a transformer such as a DC/DC converter which transforms power supplied to a motor of an electric actuator is increased as high as possible in a range of a predetermined voltage (e.g., 48 V) or less, based on laws and regulations.

In an electric suspension apparatus described in Japanese Patent Laid-Open No. 2012-131395, in a case of using a three-phase AC brushless motor, a three-phase AC unit is classified as a high voltage with AC 30 V or more. Also, for ensuring safety of the high voltage disposed outside a vehicle body during collision of a vehicle, it is necessary to ensure safety of the AC unit, which is not described in Japanese Patent Laid-Open No. 2012-131395.

The present invention is intended to improve safety of a high voltage component of an electric suspension apparatus or the like mounted in a vehicle.

SUMMARY OF THE INVENTION

An aspect of the present invention is a vehicle including a collision sensor detecting collision, a high voltage component disposed outside a vehicle body, a power source device supplying a high voltage to the high voltage component, and a control device controlling the power source device and the high voltage component, wherein in a case where the collision sensor detects the collision, the control device limits the supply of the high voltage to the high voltage component.

According to another aspect of the present invention, in the above vehicle, in the case where the collision sensor detects the collision, the control device limits a voltage supplied to the high voltage component to a predetermined voltage or less.

According to still another aspect of the present invention, in the above vehicle, the high voltage component includes a motor, and in the case where the collision sensor detects the collision, the control device short-circuits the motor.

According to a further aspect of the present invention, in the above vehicle, the high voltage component is an electric actuator of an electric suspension apparatus, the collision sensor is an acceleration sensor detecting an acceleration of the electric actuator, and the control device controls the electric actuator based on a detection result of the acceleration sensor.

According to a still further aspect of the present invention, in the above vehicle, the control device maintains the short circuit of the motor from when the collision sensor detects the collision until the vehicle stops.

According to an aspect of the present invention, safety of a high voltage component of an electric suspension apparatus or the like mounted in a vehicle can be improved.

BRIEF DESCRIPTION OF THE DRAWINGS

FIG. 4 is a flowchart showing an example of processing of a control ECU.

DETAILED DESCRIPTION OF THE PREFERRED EMBODIMENT

Hereinafter, an embodiment of the present invention will be described with reference to the drawings.

1. Configuration of Electric Suspension Apparatus

Figure 1:
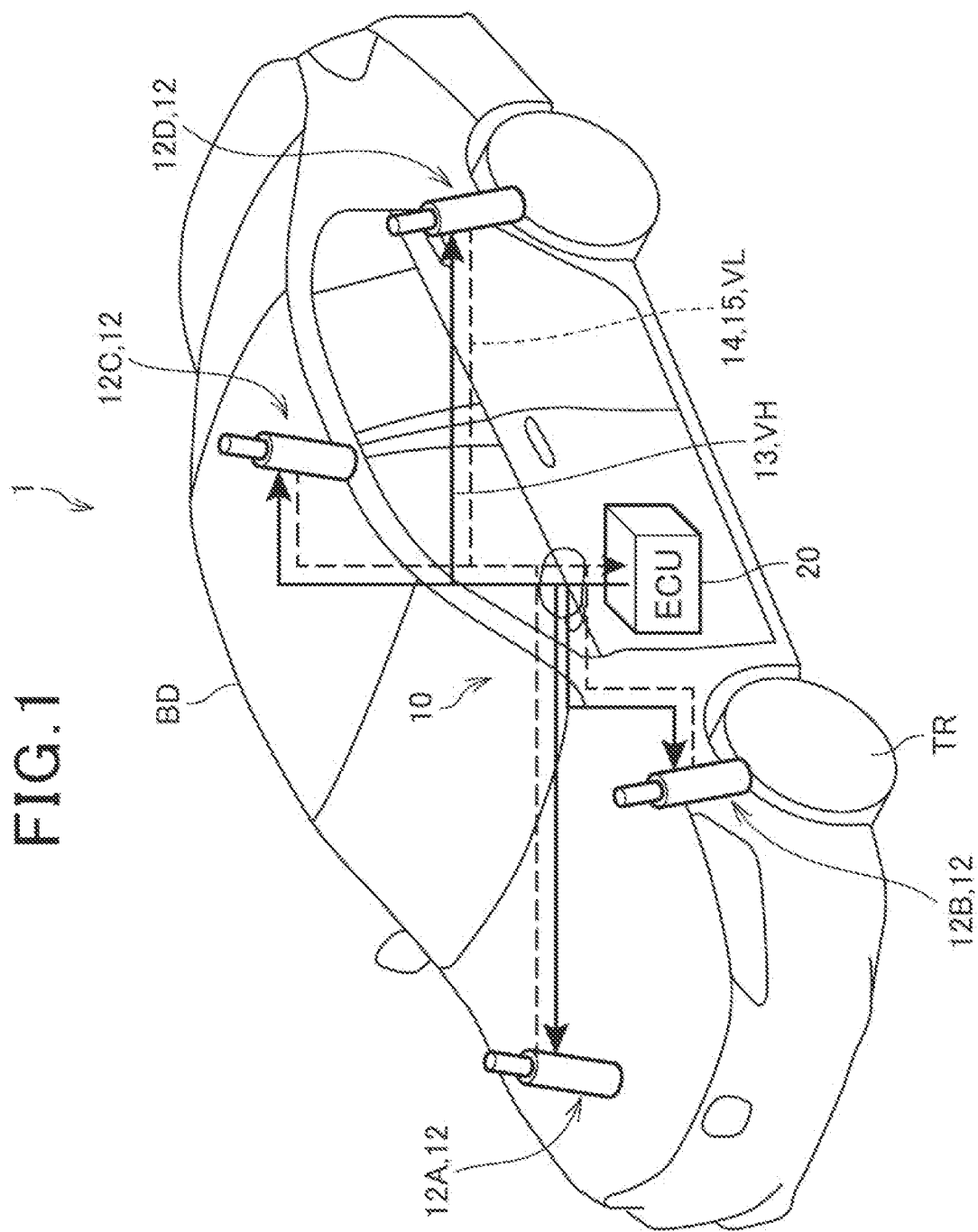
FIG. 1 is a perspective view showing an example of arrangement of an electric suspension apparatus.
Figure 2:
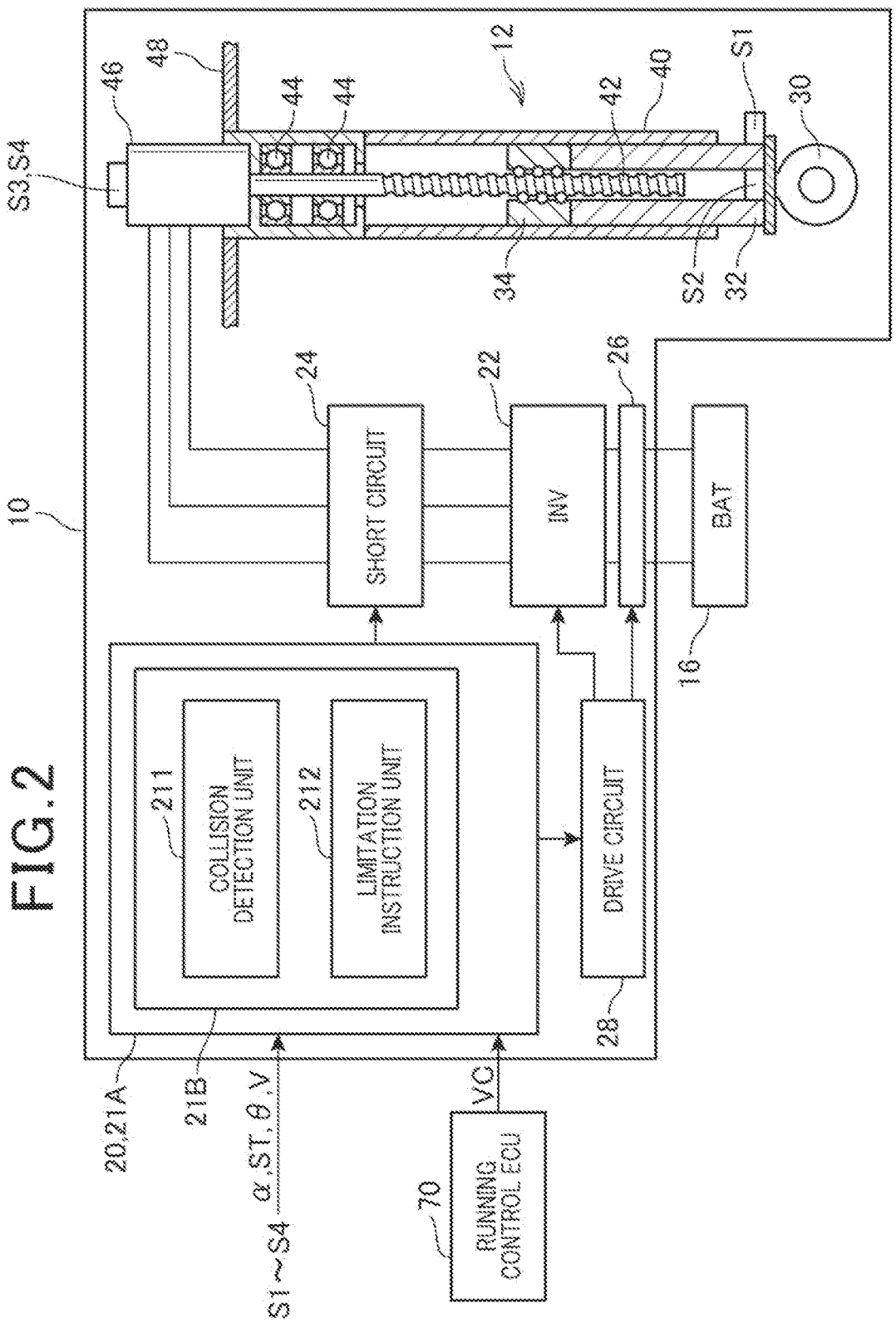
FIG. 2 is a diagram showing an example of a configuration of the electric suspension apparatus.

FIG. 1 is a perspective view showing an example of arrangement of an electric suspension apparatus 10. FIG. 2 is a diagram showing an example of a configuration of the electric suspension apparatus 10.

Description will be made as to the electric suspension apparatus 10 with reference to FIGS. 1 and 2.

As shown in FIG. 1, a vehicle 1 includes a vehicle body BD, four wheels TRs, and the electric suspension apparatus 10. The electric suspension apparatus 10 includes an electric actuator 12, and an electric suspension control ECU 20.

The electric actuator 12 is disposed outside the vehicle body BD. Specifically, the electric actuator 12 includes a first electric actuator 12A, a second electric actuator 12B, a third electric actuator 12C, and a fourth electric actuator 12D. The first electric actuator 12A is disposed between the vehicle body BD and a right front wheel. The second electric actuator 12B is disposed between the vehicle body BD and a left front wheel. The third electric actuator 12C is disposed between the vehicle body BD and a right rear wheel. The fourth electric actuator 12D is disposed between the vehicle body BD and a left rear wheel.

The electric suspension control electronic control unit (ECU) 20 controls each of the first electric actuator 12A to the fourth electric actuator 12D. The electric suspension control ECU 20 is connected to each of the first electric actuator 12A to the fourth electric actuator 12D via a high voltage line 13, a signal line 14, and a low voltage line 15.

The high voltage line 13 supplies power of a high voltage VH from a battery 16 shown in FIG. 2 to each of the first electric actuator 12A to the fourth electric actuator 12D. The power of the high voltage VH is for use in driving a motor 46 shown in FIG. 2. The high voltage VH is, for example, in a range of from AC 33 V to 38 V.

The signal line 14 transmits detection signals of a sensor S1 to a sensor S4 shown in FIG. 2 to the electric suspension control ECU 20.

Description will be made as to the sensor S1 to the sensor S4 with reference to FIG. 2.

The low voltage line 15 supplies power of a low voltage VL from the battery 16 shown in FIG. 2 to each of the first electric actuator 12A to the fourth electric actuator 12D. The power of the low voltage VL is, for example, for use in actuating the sensor S1 to the sensor S4 shown in FIG. 2. The low voltage VL is, for example, DC 5 V.

In the following description, the electric suspension control ECU 20 may be described as the control ECU 20 for convenience.

The first electric actuator 12A to the fourth electric actuator 12D include about the same configuration, and hence in a case where each of the first electric actuator 12A to the fourth electric actuator 12D is not distinguished, each of the first electric actuator 12A to the fourth electric actuator 12D may be described below simply as the electric actuator 12.

Next, description will be made as to a configuration of the electric actuator 12 with reference to FIG. 2.

As shown in FIG. 2, the electric actuator 12 includes a coupling part 30, an inner tube 32 and a nut 34 as members on a wheel TR side. Also, the electric actuator 12 includes an outer tube 40, a screw shaft 42, a bearing 44, and the motor 46 as members on a vehicle body BD side. The outer tube 40, the bearing 44 and the motor 46 are fixed to a chassis 48 disposed in a lower part of the vehicle body BD.

Description will be made as to a configuration of the motor 46 with reference to FIG. 3.

The electric actuator 12 corresponds to an example of "a high voltage component".

The screw shaft 42 is supported by the bearing 44 and the nut 34. The nut 34 has an inner surface screwed into a screw groove formed in an outer surface of the screw shaft 42 via a bearing.

When the motor 46 rotates the screw shaft 42, the nut 34 is moved in an up-down direction. When moving the nut 34 downward, the inner tube 32 is moved downward. When moving the nut 34 upward, the inner tube 32 is moved upward.

Consequently, a position of the inner tube 32 in the up-down direction to the outer tube 40 fixed to the chassis 48 of the vehicle body BD can be adjusted.

The coupling part 30 is fixed to a knuckle (not shown) of the suspension apparatus, and is accordingly coupled to the wheel TR. When inputting vibration from the wheel TR side into the coupling part 30 and applying, for example, an upward acceleration α to the coupling part 30, the inner tube 32 and the nut 34 are raised integrally with the outer tube 40. In this case, the motor 46 rotates the screw shaft 42 to move the inner tube 32 in a direction to absorb the upward acceleration α, i.e., in an upward direction, so that vibration from the wheel TR to the vehicle body BD can be attenuated.

In the electric actuator 12, an acceleration sensor S1, a stroke sensor S2, a rotation angle sensor S3 and a voltage sensor S4 are arranged.

The acceleration sensor S1 is, for example, located in the same manner as the rotation angle sensor S3 or fixed to an outer circumferential surface of the inner tube 32, and the sensor detects the acceleration α applied from the wheel TR side to the coupling part 30. The acceleration sensor S1 is disposed to tilt in a predetermined direction to a vertical direction. Alternatively, the acceleration sensor S1 may be disposed in the vertical direction.

The acceleration sensor S1 is disposed to tilt, for example, by a predetermined angle in a width direction of the vehicle body BD to the vertical direction. In this case, the sensor can detect the collision of the vehicle 1, based on a component of the acceleration α in the width direction.

Alternatively, the acceleration sensor S1 may be disposed to tilt, for example, by a predetermined angle in a front-rear direction of the vehicle body BD to the vertical direction. In this case, the sensor can detect the collision of the vehicle 1 based on a component of the acceleration α in the front-rear direction.

The acceleration sensor S1 corresponds to an example of "a collision sensor".

The stroke sensor S2 is disposed at a position facing the screw shaft 42 of the inner tube 32, to detect a stroke ST indicating a downward moving amount of the nut 34. The stroke sensor S2 is composed of a distance measurement sensor or the like.

The rotation angle sensor S3 is composed of a so-called resolver, Hall element or the like, to detect a rotation angle θ of the motor 46.

The voltage sensor S4 detects a voltage V applied to the motor 46. In a state where the motor 46 is driven with the power from the battery 16, the voltage V indicates the high voltage VH supplied from the battery 16 through the high voltage line 13.

The acceleration α, the stroke ST, the rotation angle θ and the voltage V are outputted to the control ECU 20.

2. Configuration of Electric Suspension Control ECU

The control ECU 20 controls the motor 46 through an inverter 22, based on detection results of the acceleration sensor S1, the stroke sensor S2, the rotation angle sensor S3 and the voltage sensor S4.

The control ECU 20 includes a memory 21A and a processor 21B.

The memory 21A is a storage device which stores, in a nonvolatile manner, a program to be executed by the processor 21B and data. The memory 21A is composed of a magnetic storage device, a semiconductor storage element such as a flash read only memory (ROM), or another type of nonvolatile storage device. Also, the memory 21A may include a random-access memory (RAM) included in a work area of the processor 21B. The memory 21A stores data to be processed by the control ECU 20, and a control program to be executed by the processor 21B.

The electric suspension control ECU 20 corresponds to an example of "a control device".

The processor 21B may be composed of a single processor, or a plurality of processors which function as the processor 21B. The processor 21B executes the control program to control each part of the electric suspension apparatus 10.

The control ECU 20 includes a collision detection unit 211 and a limitation instruction unit 212. Specifically, the processor 21B of the control ECU 20 executes a control program to function as the collision detection unit 211 and the limitation instruction unit 212.

Also, the control ECU 20 is communicably connected to a running control ECU 70 through on-vehicle network.

The running control ECU 70 controls running of the vehicle 1. The running control ECU 70 outputs a running speed VC of the vehicle 1 to the control ECU 20.

The collision detection unit 211 detects the collision of the vehicle 1 based on a detection result of the acceleration sensor S1. The collision detection unit 211 detects the collision of the vehicle 1, for example, based on a component of the acceleration α in a width direction which is detected by the acceleration sensor S1.

Specifically, the collision detection unit 211 detects the collision of the vehicle 1, in a case where the component of the acceleration α in the width direction has a predetermined value or more.

The limitation instruction unit 212 limits supply of power of the high voltage VH to the motor 46 of each of the first electric actuator 12A to the fourth electric actuator 12D, depending on the detection result of the collision detection unit 211.

Specifically, in a case where the collision detection unit 211 detects the collision of the vehicle 1, the limitation instruction unit 212 executes processing as follows. That is, the limitation instruction unit 212, for example, limits a voltage supplied to the motor 46 to a predetermined voltage VA or less through a boosting circuit 26, also in a case where the power supplied to the motor 46 is stopped. The predetermined voltage VA is, for example, from 20 V to 30 V.

Further description will be made as to the boosting circuit 26 with reference to FIG. 3.

Also, the limitation instruction unit 212 short-circuits the motor 46 of each of the first electric actuator 12A to the fourth electric actuator 12D, after the supply of the power of the high voltage VH to the motor 46 is limited.

Specifically, the limitation instruction unit 212 short-circuits the motor 46 of each of the first electric actuator 12A to the fourth electric actuator 12D through a short circuit 24 to be described with reference to FIG. 3.

Further, the limitation instruction unit 212 maintains the short circuit of the motor 46 from when the collision detection unit 211 detects the collision of the vehicle 1 until the vehicle 1 stops. The limitation instruction unit 212 determines that the vehicle 1 is stopped, based on the running speed VC from the running control ECU 70. For example, in a case where the running speed VC is equal to or less than 5 km/hour, the limitation instruction unit 212 determines that the vehicle 1 is stopped.

Figure 3:
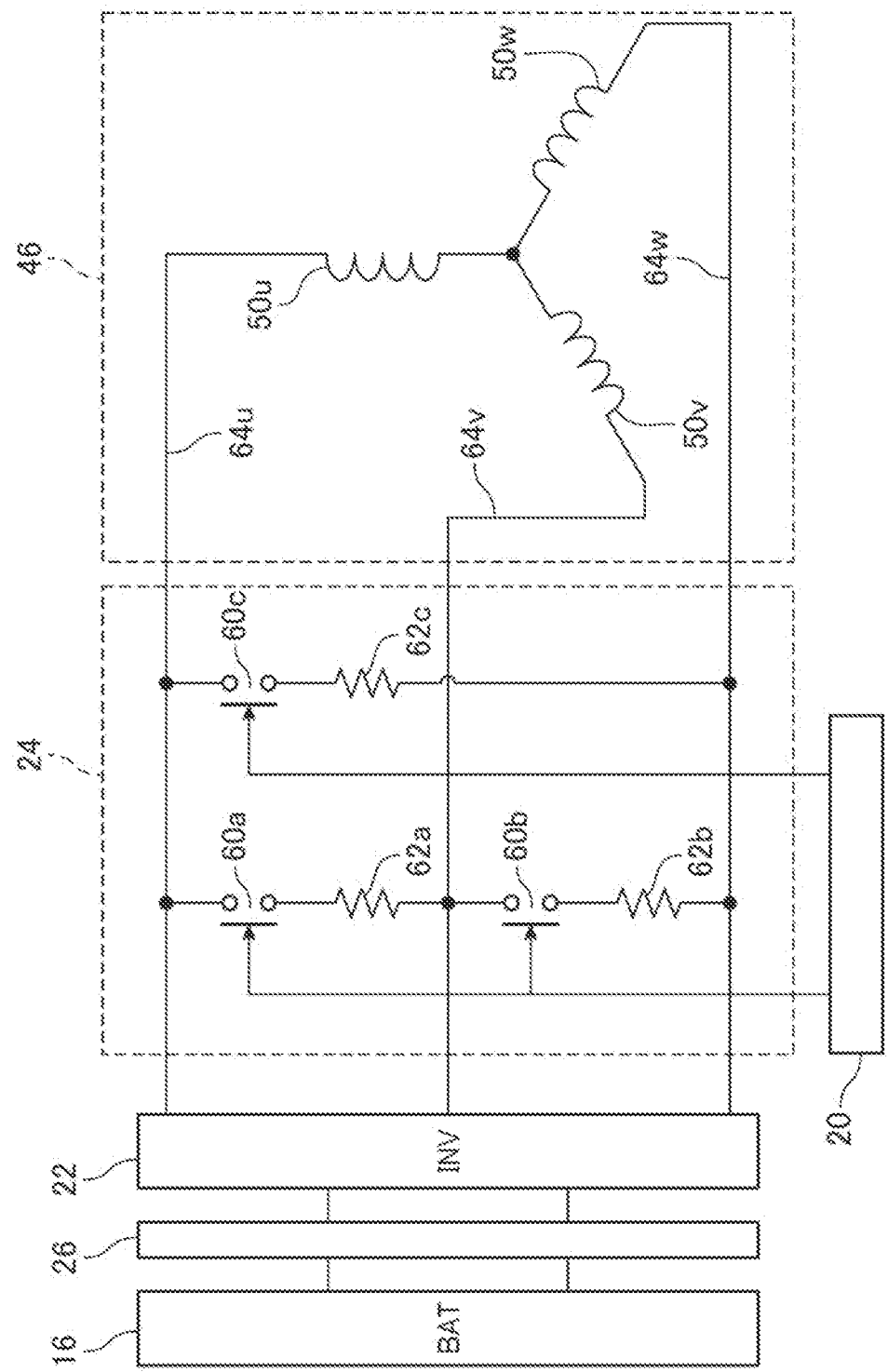
FIG. 3 is a diagram showing an example of a configuration of a short circuit.

As shown in FIGS. 2 and 3, the boosting circuit 26 is disposed between the battery 16 and the inverter 22. The boosting circuit 26 boosts the voltage supplied from the battery 16 (e.g., from 12 V to 16 V) to the high voltage VH, and the high voltage VH is supplied to the inverter 22.

Also, the boosting circuit 26 limits a voltage supplied from the inverter 22 to the motor 46 to a predetermined voltage VA or less.

The battery 16 and the boosting circuit 26 correspond to an example of "a power source device".

3. Configuration of Short Circuit

As shown in FIG. 2, the control ECU 20 controls the inverter 22 and the short circuit 24 through a drive circuit 28. The control ECU 20 controls a rotation direction and a rotation speed of the motor 46 through the inverter 22. Also, the control ECU 20 short-circuits the motor 46 through the short circuit 24.

FIG. 3 is a diagram showing an example of a configuration of the short circuit 24.

As shown in FIG. 3, the short circuit 24 includes a switch 60a, a switch 60b, and a switch 60c which turn on and off following an instruction from the control ECU 20, and a resistor 62a, a resistor 62b, and a resistor 62c.

The motor 46 is, for example, a three-phase AC brushless motor, and includes three motor coils 50u, 50v, and 50w as shown in FIG. 3.

The motor 46 rotationally drives the screw shaft 42 shown in FIG. 2 with the power supplied from the battery 16 through the inverter 22.

Further, the motor 46 generates regenerative power with an external force inputted from the wheel TR side into the screw shaft 42, and outputs the generated power to the battery 16.

The switch 60a short-circuits a power line 64u and a power line 64v corresponding to the motor coil 50u and the motor coil 50v, respectively, following the instruction from the limitation instruction unit 212. The resistor 62a adjusts current flowing through the motor coil 50u and the motor coil 50v, in a case where the switch 60a short-circuits the power lines 64u and 64v.

The switch 60b short-circuits the power line 64v and a power line 64w corresponding to the motor coil 50v and the motor coil 50w, respectively, following the instruction from the limitation instruction unit 212. The resistor 62b adjusts current flowing through the motor coils 50v and 50w, in a case where the switch 60b short-circuits the power lines 64v and 64w.

The switch 60c short-circuits the power line 64u and the power line 64w corresponding to the motor coil 50u and the motor coil 50w, respectively, following the instruction from the limitation instruction unit 212. The resistor 62c adjusts current flowing through the motor coils 50u and 50w, in a case where the switch 60c short-circuits the power lines 64u and 64w.

Note that the resistors 62a to 62c may be omitted. In this case, when short-circuiting the motor 46, an attenuation force can be generated by an electromotive force generated in the motor 46. Alternatively, one switch of three switches 60a to 60c may be omitted. Specifically, the number of the switches may be two.

The limitation instruction unit 212 turns on the switches 60a, 60b, and 60c, in the case where the collision detection unit 211 detects the collision of the vehicle 1. As a result, the motor coil 50u, the motor coil 50v and the motor coil 50w are short-circuited. That is, the motor 46 is short-circuited.

4. Processing of Control ECU

FIG. 4 is a flowchart showing an example of processing of the electric suspension control ECU 20.

First, the collision detection unit 211 determines in step S101 whether occurrence of the collision of the vehicle 1 is detected, based on the detection result of the acceleration sensor S1.

In a case where the collision detection unit 211 determines that the occurrence of the collision is not detected (NO in step S101), processing is in a standby state. In a case where the collision detection unit 211 determines that the occurrence of the collision is detected (YES in step S101), the processing advances to step S103.

Then, in the step S103, the limitation instruction unit 212 limits the voltage supplied to the motor 46 of each of the first electric actuator 12A to the fourth electric actuator 12D to the predetermined voltage VA or less through the boosting circuit 26, also in a case where power supplied to the motor 46 is stopped.

Next, in step S105, the limitation instruction unit 212 short-circuits the motor 46 of each of the first electric actuator 12A to the fourth electric actuator 12D through the short circuit 24.

Next, the limitation instruction unit 212 determines in step S107 whether the vehicle 1 is stopped.

In a case where the limitation instruction unit 212 determines that the vehicle 1 is not stopped (NO in step S107), the processing is in the standby state. Specifically, the limitation instruction unit 212 maintains the short circuit of the motor 46. In a case where the limitation instruction unit 212 determines that the vehicle 1 is stopped (YES in step S107), the processing advances to step S109.

Then, in the step S109, the limitation instruction unit 212 releases the short circuit of the motor 46 of each of the first electric actuator 12A to the fourth electric actuator 12D through the short circuit 24. Afterward, the processing ends.

As described with reference to FIG. 4, in the case where it is determined that the collision occurs, the voltage supplied to the motor 46 is limited to the predetermined voltage VA or less, so that safety of the motor 46 can be improved.

Also, in the case where it is determined that the collision occurs, the motor 46 is short-circuited, and the motor 46 is controlled to generate regenerative power, so that the motor 46 can be provided with a braking force. Therefore, an operation of the electric actuator 12 included in the electric suspension apparatus 10 can be regulated.

Further, the short circuit of the motor 46 is held until it is determined that the vehicle 1 is stopped. Therefore, the regenerative power is generated by the motor 46 until the vehicle 1 is stopped, so that the motor 46 can be provided with the braking force. Therefore, the operation of the electric actuator 12 included in the electric suspension apparatus 10 can be regulated.

5. Configurations and Effects

As described above, a vehicle 1 according to the present embodiment includes a collision sensor (e.g., acceleration sensor S1) detecting collision, a high voltage component (e.g., electric actuator 12) disposed outside a vehicle body BD, a battery 16 and a boosting circuit 26 supplying a high voltage VH to the high voltage component, and an electric suspension control ECU 20 controlling the boosting circuit 26 and the high voltage component, and in a case where the collision sensor detects the collision, the electric suspension control ECU 20 limits the supply of the high voltage VH to the high voltage component.

According to this configuration, in the case where the collision sensor detects the collision, the electric suspension control ECU 20 limits the supply of the high voltage VH to the high voltage component. Therefore, safety of the high voltage component can be improved.

Also, in a case where a collision sensor detects collision, the electric suspension control ECU 20 limits a voltage supplied to the high voltage component (e.g., the electric actuator 12) to a predetermined voltage VA or less.

According to this configuration, in the case where the collision sensor detects the collision, the electric suspension control ECU 20 limits the voltage supplied to the high voltage component to the predetermined voltage VA or less. Therefore, the safety of the high voltage component can be improved.

Also, the high voltage component (e.g., electric actuator 12) includes a motor 46, and in the case where the collision sensor detects the collision, the electric suspension control ECU 20 short-circuits the motor 46.

According to this configuration, in the case where the collision sensor detects the collision, the electric suspension control ECU 20 short-circuits the motor 46. Therefore, the motor 46 is controlled to generate regenerative power, and the motor 46 can be provided with a braking force. Therefore, an operation of the high voltage component (e.g., electric actuator 12) can be regulated.

Further, the high voltage component is an electric actuator 12 of an electric suspension apparatus 10, the collision sensor is an acceleration sensor S1 detecting an acceleration α of the electric actuator 12, and the electric suspension control ECU 20 controls the electric actuator 12 based on a detection result of the acceleration sensor S1.

According to this configuration, the collision is detected based on the detection result of the acceleration sensor S1 detecting the acceleration α of the electric actuator 12, and hence the collision can be detected with a simple configuration. Also, the electric actuator 12 is controlled based on the detection result of the acceleration sensor S1, and hence the electric actuator 12 can be appropriately operated.

Additionally, the electric suspension control ECU 20 maintains the short circuit of the motor 46 from when the collision sensor (e.g., acceleration sensor S1) detects the collision until the vehicle 1 stops.

Consequently, the motor 46 is controlled to generate the regenerative power until the vehicle 1 is stopped, so that the motor 46 can be provided with the braking force. Therefore, the operation of the high voltage component (e.g., electric actuator 12) can be regulated.

6. Another Embodiment

Note that the present invention is not limited to the above configuration of the embodiment, and the invention can be implemented in various aspects without departing from the scope of the invention.

For example, the above embodiment describes, but is not limited to the case where "a high voltage component" is the electric actuator 12. "The high voltage component" may be, for example, an in-wheel motor.

Also, the above embodiment describes, but is not limited to the case where "a power source device" includes the battery 16 and the boosting circuit 26. "The power source device" may be a power generator such as an alternator. Further, "the power source device" does not have to include the boosting circuit 26, and the device may include a step-down circuit.

Additionally, it has been described in the above embodiment that the electric actuator 12 includes the acceleration sensor S1, the stroke sensor S2, the rotation angle sensor S3, and the voltage sensor S4, but the voltage sensor S4 may be omitted.

Also, the above embodiment describes but is not limited to the case where "the collision sensor" is the acceleration sensor S1. "The collision sensor" may detect the collision of the vehicle 1. "The collision sensor" may be, for example, a front impact sensor activating an air bag.

Additionally, the above embodiment describes, but is not limited to the case where the electric suspension apparatus 10 includes the first electric actuator 12A to the fourth electric actuator 12D. For example, the electric suspension apparatus 10 may include the third electric actuator 12C and the fourth electric actuator 12D, and the apparatus does not have to include the first electric actuator 12A and the second electric actuator 12B. Conversely, the electric suspension apparatus 10 may include the first electric actuator 12A and the second electric actuator 12B, and the apparatus does not have to include the third electric actuator 12C and the fourth electric actuator 12D.

Also, the above embodiment describes, but is not limited to the case where the limitation instruction unit 212 short-circuits the motor 46 through the short circuit 24. For example, the motor 46 may be short-circuited by the limitation instruction unit 212 turning off three field effect transistors (FETs) on a plus side of the inverter 22, and fixedly turning on three FETs on a minus side.

Furthermore, in a case where the electric actuator 12 cannot continue to be normally controlled in a state where the voltage supplied to the motor 46 is limited to the predetermined voltage VA or less, it is necessary to short-circuit the motor 46 as described above. However, in a case where the electric actuator 12 can continue to be normally controlled in the state where the voltage supplied to the motor 46 is limited to the predetermined voltage VA or less, the motor 46 does not have to be short-circuited.

At least part of the respective functional blocks shown in FIG. 2 may be achieved in hardware, or in hardware and software, and is not limited to a configuration to arrange independent hardware resources as shown in the drawing.

The control program executed by the processor 21B of the electric suspension control ECU 20 of the electric suspension apparatus 10 is stored in the memory 21A, but the control program may be stored in an external HDD or the like.

The processing units shown in the flowchart of FIG. 4 are divided depending on main processing content, to facilitate understanding of the processing of the electric suspension control ECU 20 of the electric suspension apparatus 10. The embodiment is not limited by a dividing method or name of the processing unit shown in the flowchart of FIG. 4. The processing of the electric suspension control ECU 20 may be divided into much more processing units depending on processing content, and one processing unit may be divided to include further processing. The above processing order in the flowchart is not limited to the shown example.

A control method of the electric suspension control ECU 20 can be achieved by allowing the processor 21B of the electric suspension control ECU 20 to execute a control program corresponding to the control method of the electric suspension control ECU 20. The control program can be recorded in advance in a computer readable recording medium. As the recording medium, a magnetic or optical recording medium or a semiconductor memory device may be used. Specifically, examples of the recording medium include a portable recording medium such as a flexible disk, a compact disk read only memory (CD-ROM), a digital versatile disc (DVD), Blue-ray (registered trademark) disc, a magneto-optic disk, a flash memory, or a card recording medium, and a fixed recording medium. The recording medium may be a nonvolatile storage device such as RAM, ROM, HDD, or another internal storage device included in the electric suspension apparatus 10. The control method of the electric suspension control ECU 20 may be achieved by storing the control program corresponding to the control method of the electric suspension control ECU 20 in a server device or the like, and by downloading the control program from the server device to the electric suspension control ECU 20.

7. Configurations Supported by the Above Embodiment

The above embodiment supports the following configurations.

(Configuration 1)

A vehicle including a collision sensor detecting collision, a high voltage component disposed outside a vehicle body, a power source device supplying a high voltage to the high voltage component, and a control device controlling the power source device and the high voltage component, wherein in a case where the collision sensor detects the collision, the control device limits the supply of the high voltage to the high voltage component.

According to the vehicle of configuration 1, in the case where the collision sensor detects the collision, the control device limits the supply of the high voltage to the high voltage component. Therefore, safety of the high voltage component can be improved.

(Configuration 2)

The vehicle according to configuration 1, wherein in the case where the collision sensor detects the collision, the control device limits a voltage supplied to the high voltage component to a predetermined voltage or less.

According to the vehicle of configuration 2, in the case where the collision sensor detects the collision, the control device limits the voltage supplied to the high voltage component to the predetermined voltage or less. Therefore, the safety of the high voltage component can be improved.

(Configuration 3)

The vehicle according to configuration 1 or 2, wherein the high voltage component includes a motor, and in the case where the collision sensor detects the collision, the control device short-circuits the motor.

According to the vehicle of configuration 3, in the case where the collision sensor detects the collision, the control device short-circuits the motor. Therefore, the motor is controlled to generate regenerative power, and the motor can be provided with a braking force.

(Configuration 4)

The vehicle according to configuration 3, wherein the high voltage component is an electric actuator of an electric suspension apparatus, the collision sensor is an acceleration sensor detecting an acceleration of the electric actuator, and the control device controls the electric actuator based on a detection result of the acceleration sensor.

According to the vehicle of configuration 4, the collision sensor is the acceleration sensor detecting the acceleration of the electric actuator. Therefore, the collision can be detected with a simple configuration. Also, the control device controls the electric actuator based on the detection result of the acceleration sensor. Therefore, the electric actuator can be controlled with a simple configuration.

(Configuration 5)

The vehicle according to configuration 3 or 4, wherein the control device maintains the short circuit of the motor from when the collision sensor detects the collision until the vehicle stops.

According to the vehicle of configuration 5, the short circuit of the motor is held from when the collision sensor detects the collision until the vehicle stops. Therefore, the motor is controlled to generate regenerative power until the vehicle stops, so that the motor can be provided with a braking force.

REFERENCE SIGNS LIST

1 . . . vehicle, 10 . . . electric suspension apparatus, 12 . . . electric actuator (high voltage component), 12A . . . first electric actuator, 12B . . . second electric actuator, 12C . . . third electric actuator, 12D . . . fourth electric actuator, 13 . . . high voltage line, 14 . . . signal line, 15 . . . low voltage line, 16 . . . battery (part of power source device), 20 . . . electric suspension control ECU (control device), 21A . . . memory, 21B . . . processor, 211 . . . collision detection unit, 212 . . . limitation instruction unit, 22 . . . inverter, 24 . . . short circuit, 26 . . . boosting circuit (part of power source device), 28 . . . drive circuit, 30 . . . coupling part, 32 . . . inner tube, 34 . . . nut, 40 . . . outer tube, 42 . . . screw shaft, 44 . . . bearing, 46 . . . motor, 50u, 50v and 50w . . . motor coil, 60a, 60b and 60c . . . switch, 64u, 64v and 64w . . . power line, 70 . . . running control ECU, BD . . . vehicle body, S1 . . . acceleration sensor (collision sensor), S2 . . . stroke sensor, S3 . . . rotation angle sensor, S4 . . . voltage sensor, ST . . . stroke, TR . . . wheel, VA . . . predetermined voltage, VC . . . running speed, VH . . . high voltage, $\alpha$ . . . acceleration, $\theta$ . . . rotation angle

What is claimed is:

1. A vehicle comprising:
a collision sensor detecting collision of the vehicle;
an electrical suspension apparatus that is coupled to a wheel of the vehicle through a coupling part;
a battery that supplies power to an electrical actuator of the electrical suspension apparatus; and
a processor which controls the electrical suspension apparatus and the battery,
wherein
the collision sensor is an acceleration sensor that is disposed on the electrical actuator and that detects an acceleration applied to the coupling part from the wheel side, and
the processor, in a case where the acceleration detected by the acceleration sensor is equal to or greater than a predetermined value, detects the collision, and reduces a voltage of the power supplied to the electrical actuator.

2. The vehicle according to claim 1, wherein
in the case where the collision is detected, the processor short-circuits the electrical actuator.

3. The vehicle according to claim 2, wherein the processor maintains the short circuit of the electrical actuator from when the collision is detected until the vehicle stops.

4. The vehicle according to claim 1, wherein
the processor controls the electric actuator based on a detection result of the acceleration sensor.

5. The vehicle according to claim 1, wherein
the acceleration sensor is disposed to tilt by a predetermined angle in a front-rear direction or width direction of a vehicle body of the vehicle to the vertical direction, and
the processor detects the collision of the vehicle based on a component of the acceleration detected by the acceleration sensor in a tilted direction of the acceleration sensor.

* * * * *